(12) United States Patent
Ayabe

(10) Patent No.: US 7,686,113 B2
(45) Date of Patent: Mar. 30, 2010

(54) BONNET AND METHOD OF MANUFACTURING THE SAME

(75) Inventor: Hiroaki Ayabe, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 182 days.

(21) Appl. No.: 11/574,204

(22) PCT Filed: Sep. 14, 2004

(86) PCT No.: PCT/JP2004/013373

§ 371 (c)(1),
(2), (4) Date: Aug. 10, 2007

(87) PCT Pub. No.: WO2006/022034

PCT Pub. Date: Mar. 2, 2006

(65) Prior Publication Data

US 2008/0011532 A1    Jan. 17, 2008

(30) Foreign Application Priority Data

Aug. 24, 2004  (JP) .............................. 2004-244476

(51) Int. Cl.
*B62D 25/10* (2006.01)
(52) U.S. Cl. .................................. 180/69.2; 180/69.24
(58) Field of Classification Search ................ 180/69.2, 180/69.21, 69.24, 68.6, 89.17; 16/306, 289
See application file for complete search history.

(56) References Cited

U.S. PATENT DOCUMENTS 1,919,656 A    7/1933  Ireland

| 2,542,238 A | * | 2/1951 | Dreyfuss | 180/68.4 |
| 2,796,141 A | * | 6/1957 | Schreiner | 180/68.6 |
| 5,193,636 A | * | 3/1993 | Holm | 180/68.1 |
| 5,490,574 A | * | 2/1996 | Ishiizumi et al. | 180/68.1 |
| 5,564,514 A | * | 10/1996 | Knight | 180/69.21 |
| 5,645,133 A | * | 7/1997 | Thompson et al. | 180/69.21 |

(Continued)

FOREIGN PATENT DOCUMENTS

EP    0 906 863 A2    7/1999

(Continued)

OTHER PUBLICATIONS

International Search Report For International Appl. No. PCT/JP2004/13373, Japanese Patent Office, mailed on Nov. 30, 2004, 1 page.

(Continued)

*Primary Examiner*—Hau V Phan
(74) *Attorney, Agent, or Firm*—Sterne, Kessler, Goldstein & Fox, P.L.L.C.

(57) ABSTRACT

The purpose of the present invention is to construct cheaply a light and rigid bonnet of a working vehicle having a working machine such as a loader or a tractor without providing a reinforcement member in an opening of the bonnet, and to improve the external appearance of the bonnet and maintainability of an engine room. A bonnet has rear and lower portions thereof that are opened and an opening is provided in a front or side surface of the bonnet so as to provide an intake grille. The whole bonnet besides the opening is formed hollowly. A front guard is embedded in the opening provided at a center of a front end of the bonnet.

18 Claims, 6 Drawing Sheets

U.S. PATENT DOCUMENTS

| | | | | |
|---|---|---|---|---|
| 5,782,312 | A * | 7/1998 | Murakawa | 180/69.2 |
| 6,068,675 | A | 5/2000 | Tsuda et al. | |
| 6,082,477 | A * | 7/2000 | Murakawa | 180/69.21 |
| 6,167,977 | B1 * | 1/2001 | Adamson et al. | 180/69.2 |
| 6,213,235 | B1 * | 4/2001 | Elhardt et al. | 180/69.2 |
| 6,401,851 | B1 * | 6/2002 | Keen | 180/89.17 |
| 6,447,152 | B1 * | 9/2002 | Goebert | 362/485 |
| 6,487,754 | B1 * | 12/2002 | Keen | 16/306 |
| 6,837,326 | B2 * | 1/2005 | Haun et al. | 180/68.6 |
| 6,918,171 | B2 * | 7/2005 | Kucera et al. | 180/69.2 |
| 6,929,279 | B2 * | 8/2005 | Boden | 180/69.21 |
| 7,001,133 | B2 * | 2/2006 | Muramoto | 414/686 |
| 2003/0057005 | A1 | 3/2003 | Nagai et al. | |
| 2004/0216934 | A1 * | 11/2004 | Tomiyama et al. | 180/68.1 |
| 2005/0211487 | A1 * | 9/2005 | Obe et al. | 180/69.21 |

FOREIGN PATENT DOCUMENTS

| | | |
|---|---|---|
| JP | 51-19413 | 2/1976 |
| JP | 60-65174 | 5/1985 |
| JP | 5-12370 | 2/1993 |
| JP | 7-40860 | 2/1995 |
| JP | 2003-48571 | 2/2003 |
| WO | WO 99/01314 | 1/1999 |

OTHER PUBLICATIONS

Supplementary European Search Report For European Appl. No. 04773046, European Patent Office, dated on Sep. 5, 2007, 3 pages.

* cited by examiner

BONNET AND METHOD OF MANUFACTURING THE SAME

BACKGROUND OF THE INVENTION

1. Field of the Invention

The present invention relates to a structure of a bonnet covering an engine of a working vehicle. Especially, the present invention relates to structure of a bonnet of a working vehicle so that a loader or another working machine may be positioned above the bonnet.

2. Background Art

Conventionally, it is well known in a working vehicle, such as a loader or a tractor, that an engine room is covered by a bonnet and the bonnet is opened and closed by rotating the bonnet longitudinally.

With regard to the structure of the bonnet, it is known in the art that the bonnet is formed by resin material and a reinforcement member is disposed in an opening provided at the tip of the bonnet (for example, see the Patent Literature 1).

Generally, there is a known construction that a front guard is provided on a front surface of a connection plate provided in the opening of the bonnet so as to protect the connection plate (for example, see the Patent Literature 2).

Patent Literature 1: the Japanese Patent Laid Open Gazette Hei. 8-268337

Patent Literature 2: the Japanese Patent Laid Open Gazette Hei. 9-309393

However, with regard to the conventional structure of the bonnet, for example the Patent Literature 1, it is necessary to provide the reinforcement member so that it is disposed in the opening provided in the front surface of the bonnet.

Furthermore, with regard to the opening of the bonnet, the front guard must be detached so as to open the bonnet. Since the front guard obstructs the loading of mud or sand, the traveling locus of the working machine is restricted.

BRIEF SUMMARY OF THE INVENTION

Problems to Be Solved by the Invention

The purpose of the invention is to provide cheaply a light and rigid bonnet which has enough intensity without providing a reinforcement member in an opening thereof, and to improve the external appearance of the bonnet and maintainability of an engine room.

Means for Solving the Problems

The above-mentioned problems are solved by the following means according to the present invention.

A bonnet according to the present invention, has rear and lower portions thereof that are opened and an opening for an intake grille is provided in a front or side surface of the bonnet. The whole bonnet including the front surface, the side surface and an upper surface is constructed by an integral member which is formed hollowly.

According to the present invention, the opening is provided at the front surface, and a front guard is embedded in the opening.

According to the present invention, a dustproof net is attached behind the front guard so as to cover the whole opening.

According to the present invention, a bonnet lock is attached to a lower rear portion of the front guard.

According to the present invention, a uneven part is provided at an open side of the opened rear and lower portions of the bonnet.

According to the present invention, a rugged part is provided on an inner surface of the bonnet.

According to the present invention, a bonnet has rear and lower portions thereof that are opened, and an opening for an intake grille is provided in front or side surface of the bonnet. The whole bonnet including the front surface, the side surface and an upper surface is formed hollowly by rotational molding.

EFFECT OF THE INVENTION

The present invention constructed as described above brings the following effects.

A bonnet has rear and lower portions thereof that are opened and an opening for an intake grille is provided in a front or side surface of the bonnet. The whole bonnet including the front surface, the side surface and an upper surface is constructed by an integral member which is formed hollowly. Accordingly, the simple and rigid bonnet can be provided cheaply.

The opening is provided at the front surface, and a front guard is embedded in the opening. Accordingly, the bonnet is rigid enough to resist large shock by a thing, dropping on the upper side of the bonnet the like.

A dustproof net is attached behind the front guard so as to cover the whole opening. Accordingly, the dustproof net can be opened and closed integrally with the bonnet, thereby improving the maintainability.

A bonnet lock is attached to a lower rear portion of the front guard. Accordingly, shock caused by opening or closing the bonnet is received through the front guard by the whole bonnet. Namely, the shock is not concentrated on the bonnet lock, whereby damage of the bonnet is prevented.

A uneven part is provided at an open side of the opened rear and lower portions of the bonnet. Accordingly, by the uneven part, noise is not leaked out directly, thereby improving soundproof effect.

A rugged part is provided on an inner surface of the bonnet. Accordingly, the frequency of noise at the inside of the bonnet is varied so as to improve a soundproof effect.

A bonnet has rear and lower portions thereof that are opened, and an opening for an intake grille is provided in front or side surface of the bonnet. The whole bonnet including the front surface, the side surface and an upper surface is formed hollowly by rotational molding. Accordingly, the production processes are reduced so as to reduce the material cost and the production cost.

BRIEF DESCRIPTION OF THE DRAWINGS/FIGURES

DETAILED DESCRIPTION OF THE INVENTION

A bonnet according to the present invention is attached to a working vehicle so that a front loader or another working machine may be positioned above the bonnet, and the bonnet covers an engine and accessories such as a radiator and a battery. One of the ends of the bonnet is rotatably supported by a body frame of the working vehicle interacts as a fulcrum so that the bonnet can be opened and closed.

Figure 1:
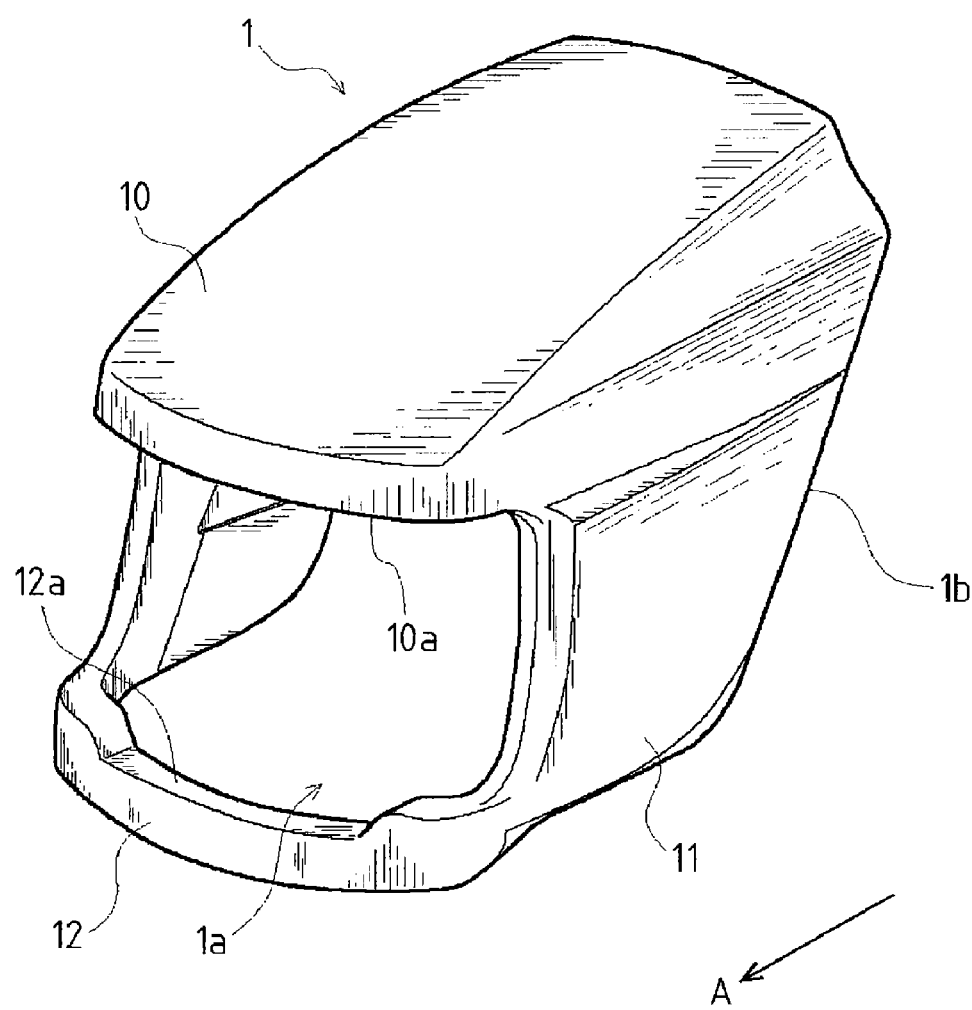
FIG. 1 is a perspective front view of a bonnet according to the present invention.

In addition, hereinafter, the direction A in FIG. 1 is regarded as the front of the bonnet.

As shown in FIG. 1, an opening 1a is provided in a center of a front surface of a front end of a bonnet 1 according to the present invention so as to form an intake grille. The rear and lower parts of the bonnet 1 are opened, and the open perimeter of the bonnet is regarded as an open side 1b. The front of the bonnet 1 is in agreement with the front of the working vehicle.

The bonnet 1 is shaped to be hollow from resin material by rotational molding. In other words, the bonnet 1 has a hollow layer 20 wholly so as to minimize the weight of the bonnet.

The opening 1a is substantially square-shaped and is disposed at the center of the front surface of the front end of the bonnet 1.

The bonnet 1 comprises an upper plate 10 constituting the upper surface, side plates 11 hanging down from both sides of the upper plate 10 and constituting the side surfaces, and a chin 12 arranged below the opening 1a and connecting the lower front portions of both side plates 11 to each other. These parts are formed integrally, and the perimeter of the opening 1a is closed. A front surface 13 extended downward from the front end of the upper plate 10 is disposed above the opening 1a, and the front surface 13 and the front surface of the chin 12 are substantially on the same surface. Each side of the opening 1a encroaches on the front portion of the side plate 11 so that air can be taken in partially from the side at both sides of the opening 1a. By this construction of the bonnet wherein the perimeter of the opening 1a is not opened, flexion is reduced so as to prevent deformation of the bonnet, thereby improving the rigidity.

As was previously mentioned, the bonnet 1 comprising the upper plate 10, the side plates 11 and the chin 12 has the hollow layer.

By forming the bonnet 1 hollowly, the bonnet 1 is stronger against bending or depression and is restorative compared with that constructed previously, whereby a light and rigid bonnet can be provided cheaply.

Figure 2:
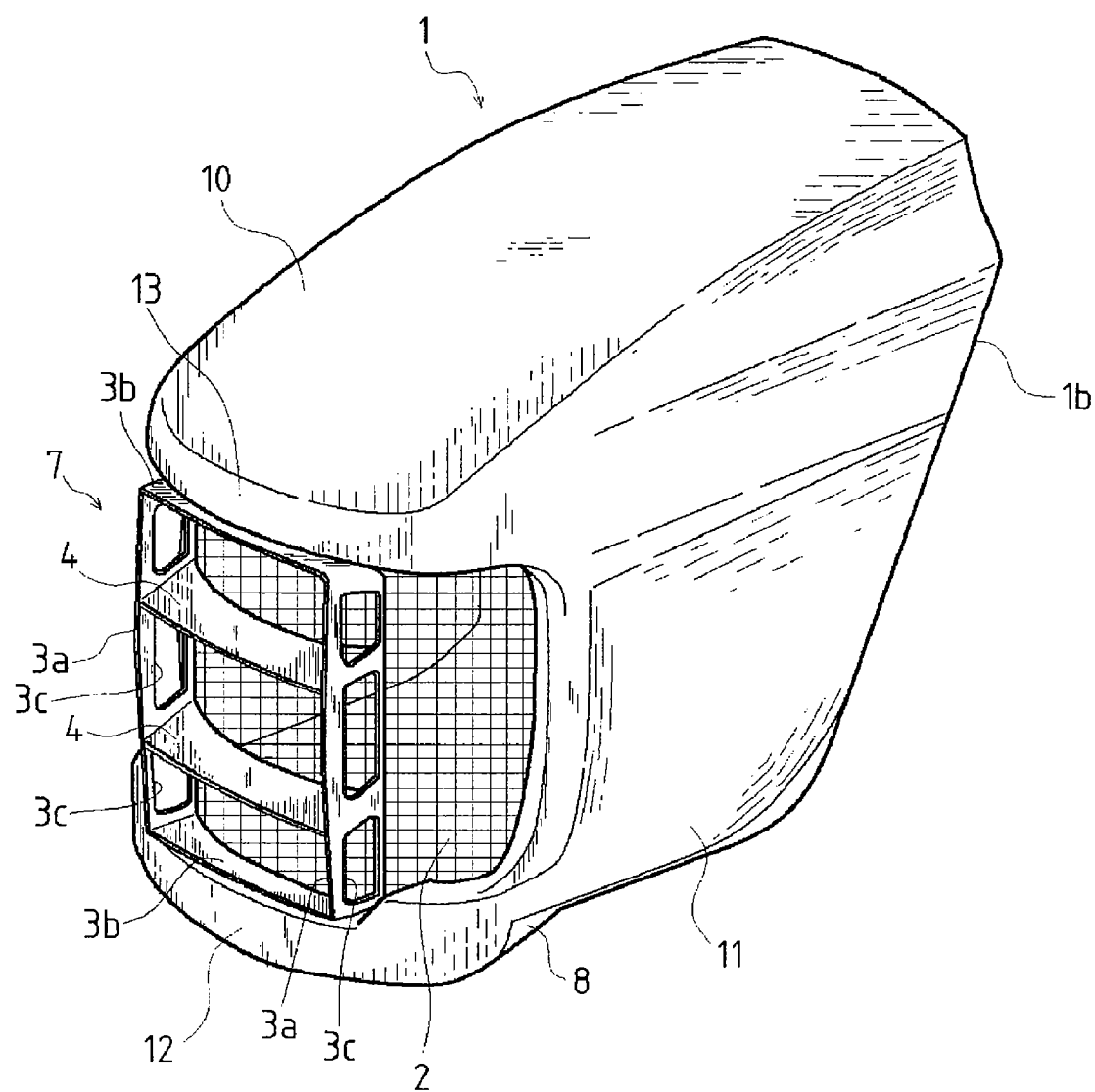
FIG. 2 is a perspective front view of the bonnet to which a front guard is attached.

As shown in FIG. 2, a dustproof net 2 is attached to the opening 1a, and a sheet metal front guard 7 is attached in front of the dustproof net 2.

The dustproof net 2 covers the whole opening 1a tightly so as to prevent dust from entering the inside of the bonnet 1. The dustproof net 2 is attached to the inside of the opening 1a and is constructed by a net, punching metal or the like.

The front guard 7 comprises a square-shaped frame body 3 when viewed in front and connection plates 4 horizontally connecting vertical frames 3a at the left and right sides of the frame body 3 to each other. Each of the vertical frames 3a is opened therein with openings 3c at suitable intervals so as to reduce the weight. Each of the upper ends and lower ends of the vertical frames 3a are connected by a lateral frame 3b.

The connection plates 4 are arranged between the lateral frames 3b horizontally so that the frame body 3 and the connection plates 4 are constructed ladder-like, thereby improving the rigidity. The connection plates 4 are slanted forward and downward so as to rectify air flow. Namely, in consideration of the arrangement of the engine and the arrangement of the radiator, the battery and the like between the engine and the opening, the vertical frames 3a and the connection plates 4 are slanted so as to serve as air guide plates changing the direction of cooling air, thereby improving the cooling effect. The dustproof net 2 is arranged on the rear surface of the front guard 7.

Then, the front guard 7 constructed as the above is attached embeddingly to the opening 1a provided at the center of the front end of the bonnet 1.

Figure 3:
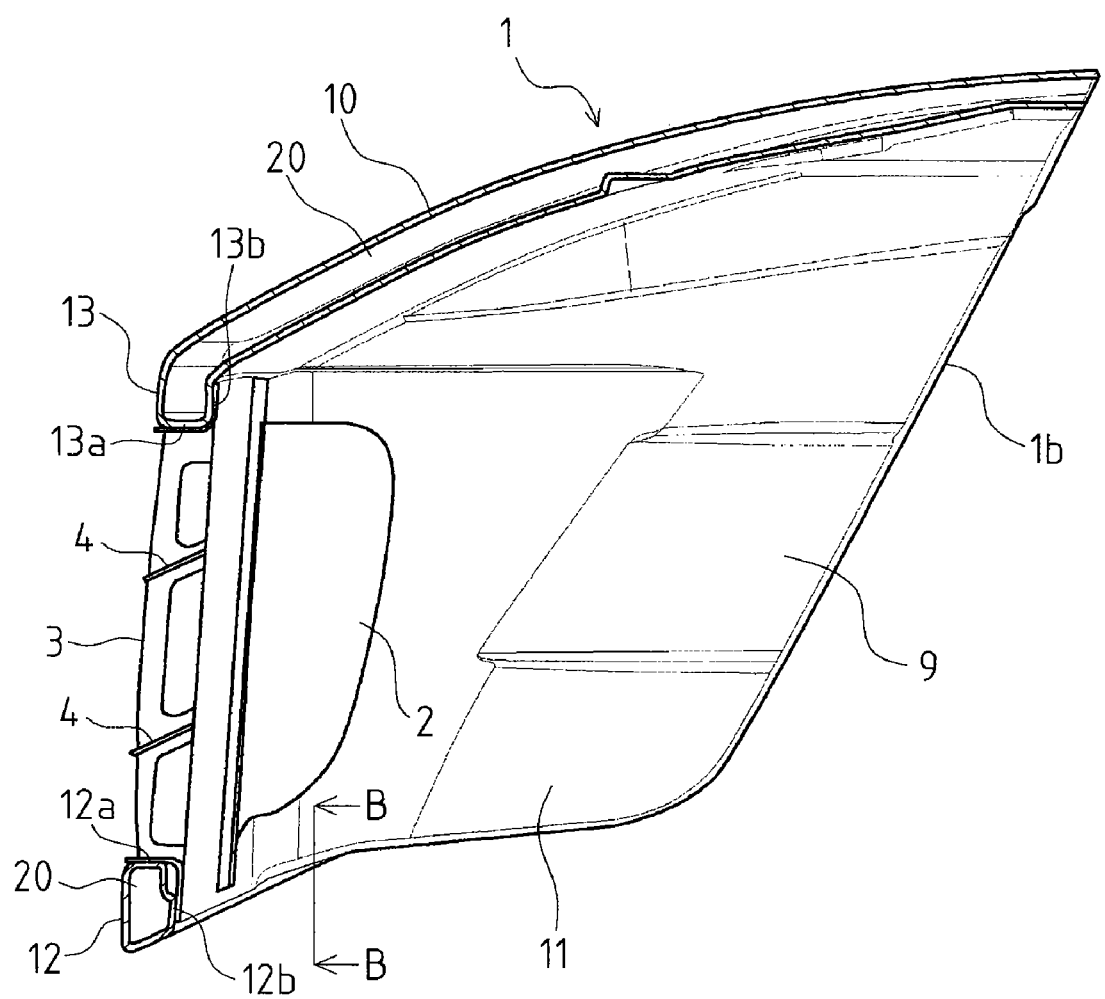
FIG. 3 is a sectional side view of the same.

As shown in FIG. 3, the lower end surface of the front surface 13 of the upper plate 10 facing to the opening 1a and the upper surface of the chin 12 are horizontal, and the front guard 7 is disposed on the lower end surface of the front surface 13 and the upper surface of the chin 12 which are horizontal.

More concretely, the upper and lower lateral frames 3b of the front guard 7 are substantially L-like shaped when viewed in side sectionally. The upper lateral frame 3b is engaged and fixed to a horizontal surface 10a formed at the lower surface of the front surface 13 and a vertical surface 10b formed at the inner surface above and behind the horizontal surface 10a. The lower lateral frame 3b is engaged and fixed to a horizontal surface 12a formed at the upper surface of the chin 12 and a vertical surface 12b formed at the inner surface below and behind the horizontal surface 12a. Namely, the front guard 7 is engaged and fixed to the rear of the opening 1a so as to be embedded. The front end of the front guard 7 is in agreement with or further-in than the front ends of the front surface 13 and the chin 12.

By this disposition means of the front guard, the front guard 7 arranged at the opening 1a of the bonnet 1 is not projected forward. Accordingly, in addition to protecting the dustproof net 2, the front guard does not obstruct the work of a working machine such as a front loader or a backhoe attached to the working vehicle. Furthermore, the external appearance is improved.

The front guard 7 is disposed inside the opening 1a so as to improve the rigidity. Accordingly, even if a stone or the like drops on the bonnet 1 or a heavy load is applied on the upper portion of the bonnet, the bonnet is not broken and the members inside the bonnet are protected.

Furthermore, the front guard 7 is attached to the bonnet 1 so that the front guard 7 is rotated integrally with the bonnet 1 when the bonnet 1 is rotated to be opened or closed. Namely, it is not necessary particularly to provide any hinge or link so as to interlock the front guard 7 with the bonnet 1, thereby simplifying the structure.

Figure 4:
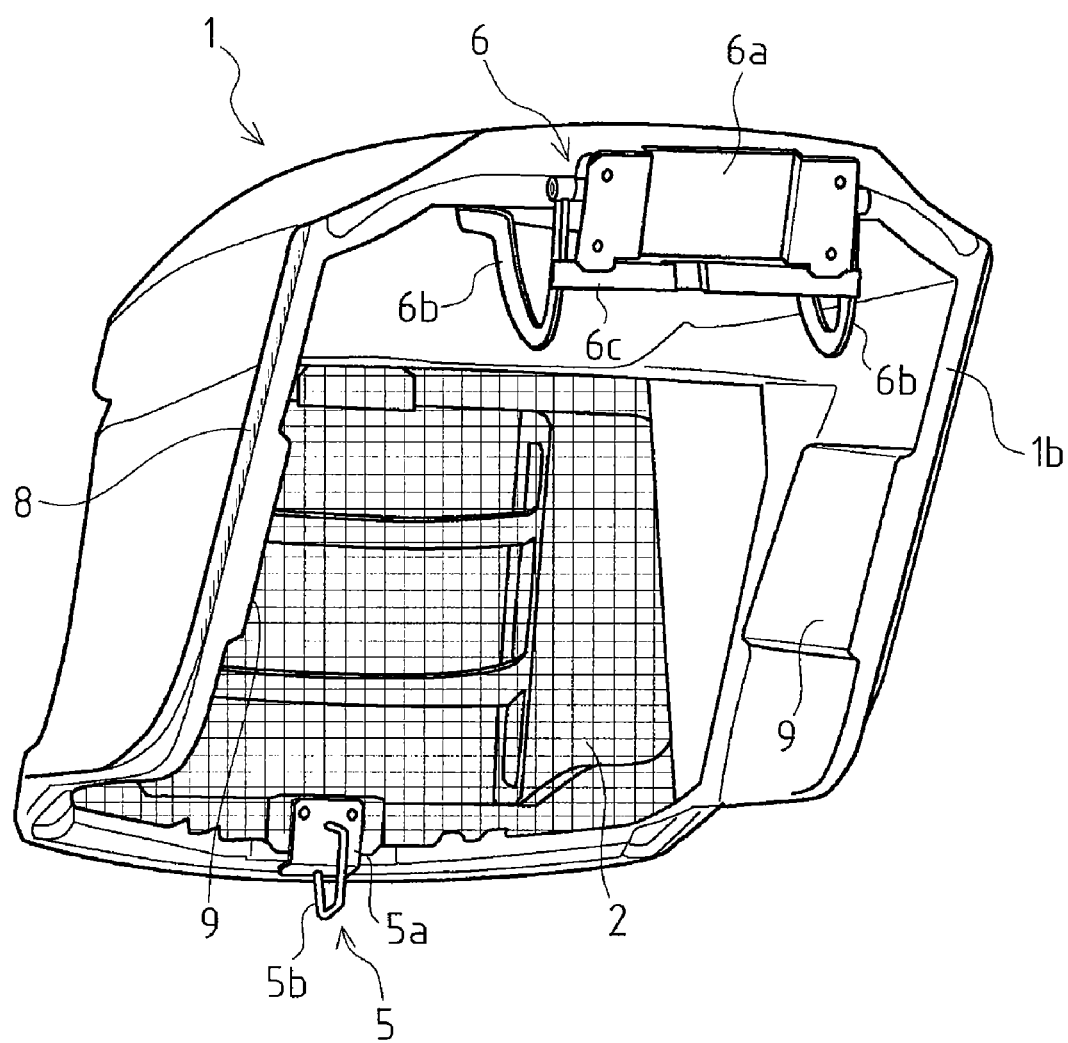
FIG. 4 is a perspective rear view of the same.
Figure 5:
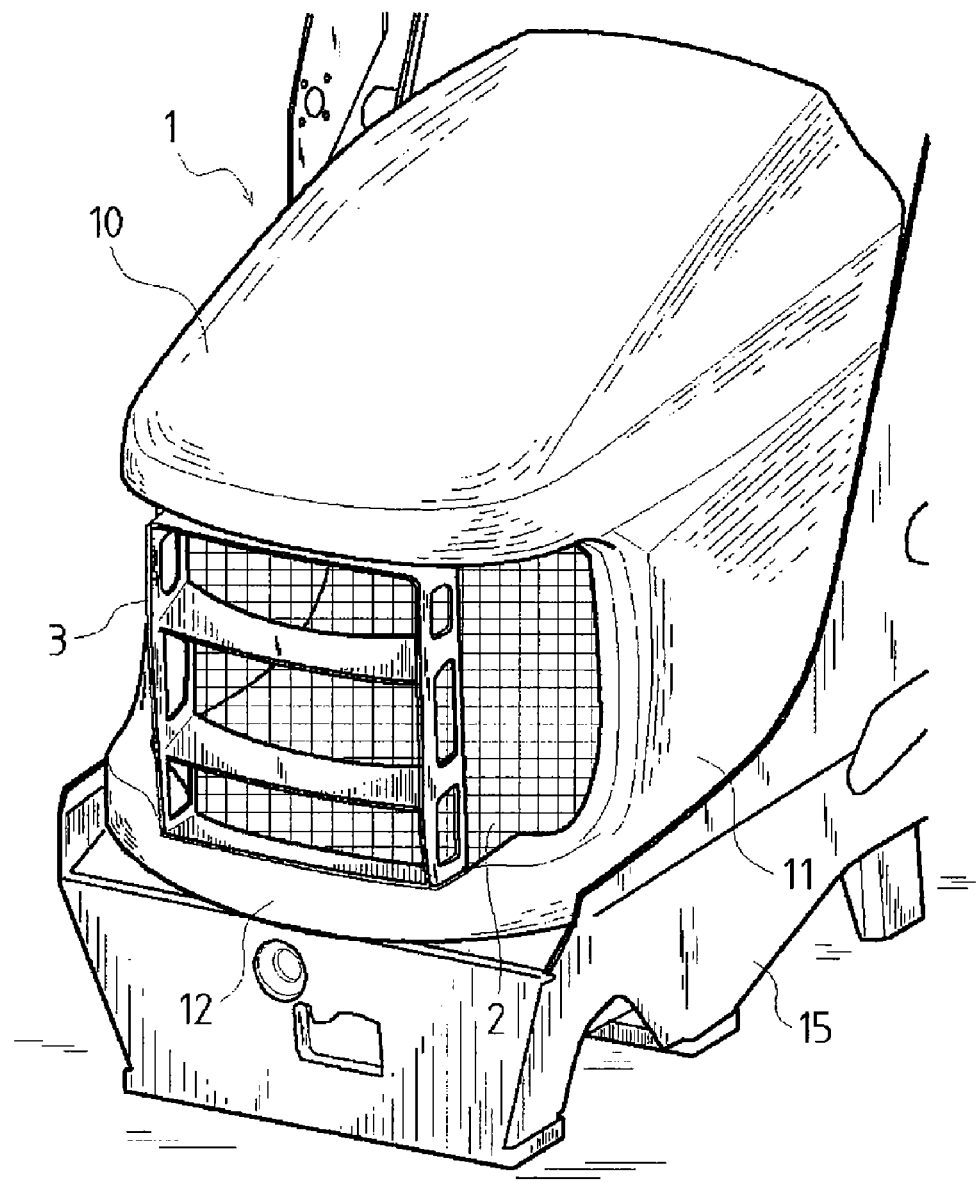
FIG. 5 is a perspective front view of the bonnet attached to a vehicle.

As shown in FIG. 4, a bonnet lock 5 is fixed to the lower rear portion of the front guard 7, and the bonnet lock 5 prevents the bonnet 1 from opening involuntarily by vibration or the like at the time of working.

The bonnet lock 5 comprises a fixed base 5a fixed to the front guard 7 and a ring-like held body 5b attached to the fixed base 5a, and the held body 5b is held by a lock pin or the like (not shown) provided in the body of the working vehicle.

By providing the bonnet lock 5 in the lower portion of the front guard 7 as described above, not only can the bonnet 1 can be locked, but also shock caused by opening or closing the bonnet 1 is received through the front guard 7 by the whole bonnet 1. Namely, the pressure of shock caused by opening or closing the bonnet 1 is not concentrated on the bonnet lock 5, whereby the life of the bonnet lock 5 is extended.

A hinge 6 which is a rotary fulcrum of the bonnet 1 is provided at the lateral center of the open side 1b of the rear end of the upper plate 10 of the bonnet 1. The hinge 6 comprises a fixed base 6a fixed to the body of the working vehicle, a pair of bonnet support bodies 6b rotatably attached to the fixed base 6a, and a reinforcement body 6c hanged from the bonnet support bodies 6b.

Each of the pair of bonnet support bodies 6b is U-like shaped, and the front portion thereof is bent horizontally and supports the bonnet 1.

According to the hinge 6 constructed as described above, the bonnet 1 is opened and closed by rotating the bonnet support bodies 6b about the fixed base 6a. The bonnet 1 is opened by rotating the lower front portion thereof upward.

By enabling the bonnet 1 to be opened by rotating the lower front portion thereof upward, the maintainability is improved.

In addition, the structure of the hinge 6 is not limited to the above-mentioned embodiment.

Figure 6:
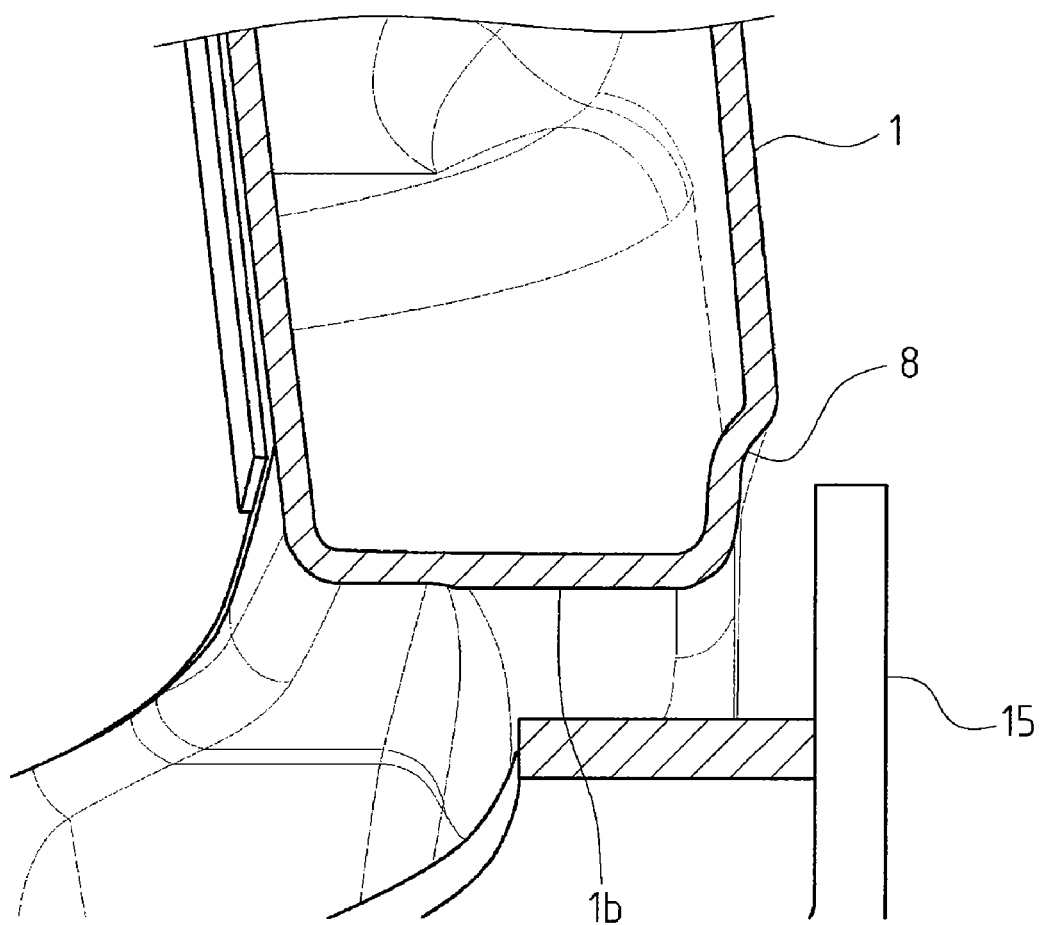
FIG. 6 is an arrow sectional view of the line B-B in FIG. 3.

As shown in FIGS. 2, 4 and 6, a uneven part 8 is formed in the open side 1b of the bonnet 1.

The uneven part 8 is formed by collapsing the outer side of the open side 1b of the bonnet 1 inward.

When the bonnet 1 is closed, a gap is generated between a body frame 15 and the open side 1b. If the gap communicates the inside and outside of the bonnet 1 directly with each other, noise is leaked out directly. Then, at the joint part between the edge of the body frame 15 on the extension of the outer surface of the bonnet 1 and the bonnet 1, the edge of the body frame 15 is arranged to face the uneven part 8 provided on the open side 1b of the bonnet 1. Accordingly, a so-called labyrinth is constructed between the edge of the body frame 15 and the uneven part 8, whereby noise generated at the inside of the bonnet is not leaked out directly so as to improve a soundproof effect.

As shown in FIGS. 3 and 4, rugged parts 9 are formed on the inner surface of the bonnet 1 (on the inner surfaces of the side plates 11 in this embodiment). The rugged parts 9 vary the frequency of noise at the inside of the bonnet 1 so as to improve a soundproof effect.

In this embodiment, one rugged part 9 is provided on each of the left and right sides. However, the construction of the rugged part is not limited thereto. The rugged part may be formed on the inner surface of the upper plate 10, and the shape and number of the rugged part is determined so that the noise does not resonate.

INDUSTRIAL APPLICABILITY

The present invention provides a simple and rigid bonnet cheaply so as to improve the intensity of the bonnet and to reduce the cost for manufacturing the bonnet with regard to a working vehicle widely.

What is claimed is:

1. A bonnet comprising:
   an integral member opened at a rear portion and at a bottom portion, wherein the integral member is formed to have an outer surface defining an entire outer portion of the integral member, an inner surface defining an entire inner portion of the integral member disposed opposite to the outer surface, and a hollow layer disposed between the outer surface and the inner surface, the outer surface of the integral member comprising:
   an upper surface;
   a front surface comprising an upper front surface and a lower front surface;
   a first side surface;
   a second side surface; and
   an opening for an intake grille defined by the upper front surface, the lower front surface, the first side surface, and the second side surface;
   wherein the upper surface extends between the first side surface and the second side surface along substantially an entire length of the first and second side surfaces.

2. The bonnet as set forth in claim 1, wherein a front guard is embedded in the opening so that the front guard is substantially entirely positioned within the opening.

3. The bonnet as set forth in claim 2, wherein a dustproof net is attached to the integral member behind the front guard so as to cover the whole opening.

4. The bonnet as set forth in claim 2, wherein a bonnet lock is attached to a lower rear portion of the front guard.

5. The bonnet as set forth in claim 3, wherein a bonnet lock is attached to a lower rear portion of the front guard.

6. The bonnet as set forth in claim 1, wherein an uneven part is provided at an open side of the opened rear and lower portions of the bonnet to minimize noise transmission.

7. The bonnet as set forth in claim 6, wherein a rugged part is provided on an inner surface of the bonnet to vary a frequency of noise inside the bonnet.

8. The bonnet as set forth in claim 1, wherein a rugged part is provided on an inner surface of the bonnet to vary a frequency of noise inside the bonnet.

9. A method of manufacturing a bonnet comprising an integral member, the method comprising:
   forming the integral member by rotational molding to have an outer surface defining an entire outer portion of the integral member, an inner surface defining an entire inner portion of the integral member disposed opposite to the outer surface, and a hollow layer disposed between the outer surface and the inner surface, wherein the outer surface of the integral member comprises:
   an upper surface;
   a front surface comprising an upper front surface and a lower front surface;
   a first side surface;
   a second side surface; and
   an opening for an intake grille defined by the upper front surface, the lower front surface, the first side surface, and the second side surface;
   wherein the upper surface extends between the first side surface and the second side surface along substantially an entire length of the first and second side surfaces.

10. The bonnet as set forth in claim 1, further comprising a hinge attached to the bonnet.

11. The bonnet as set forth in claim 10, wherein the hinge is attached to the rear portion of the bonnet.

12. A bonnet comprising:
   an integral member opened at a rear portion and at a bottom portion, wherein the integral member is formed to have an outer surface defining an entire outer portion of the integral member, an inner surface defining an entire inner portion of the integral member disposed opposite to the outer surface, and a hollow layer disposed between the outer surface and the inner surface, the outer surface of the integral member comprising:
   an upper surface;
   a front surface comprising an upper front surface and a lower front surface;
   a first side surface;
   a second side surface; and
   an opening for an intake grille defined by the upper front surface, the lower front surface, the first side surface, and the second side surface; and
   a front guard embedded in the opening so that the front guard is substantially entirely positioned within the opening.

13. The bonnet as set forth in claim 12, wherein a dustproof net is attached to the integral member behind the front guard so as to cover the whole opening.

14. The bonnet as set forth in claim 12, wherein a bonnet lock is attached to a lower rear portion of the front guard.

15. The bonnet as set forth in claim 12, wherein an uneven part is provided at an open side of the opened rear and lower portions of the bonnet to minimize noise transmission.

16. The bonnet as set forth in claim 12, wherein a rugged part is provided on an inner surface of the bonnet to vary a frequency of noise inside the bonnet.

17. The bonnet as set forth in claim 12, further comprising a hinge is attached to the bonnet.

18. The bonnet as set forth in claim 17, wherein the hinge is attached to the rear portion of the bonnet.

* * * * *

UNITED STATES PATENT AND TRADEMARK OFFICE
CERTIFICATE OF CORRECTION

PATENT NO. : 7,686,113 B2 Page 1 of 1
APPLICATION NO. : 11/574204
DATED : March 30, 2010
INVENTOR(S) : Hiroaki Ayabe It is certified that error appears in the above-identified patent and that said Letters Patent is hereby corrected as shown below:

In the Specification, Column 2, line 27: "the bonnet the like" should read --the bonnet or the like--.

In the Specification, Column 4, line 56: "can be locked" should read --be locked--.

Column 8, line 2: "a hinge is attached" should read --a hinge attached--.

Signed and Sealed this

Twenty-seventh Day of July, 2010

David J. Kappos
*Director of the United States Patent and Trademark Office*